United States Patent [19]
Feierlein

[11] Patent Number: 5,295,724
[45] Date of Patent: Mar. 22, 1994

[54] AIR-CONDITIONING ARRANGEMENT FOR PARKED PASSENGER CARS

[75] Inventor: Johannes Feierlein, Oberpframmern, Fed. Rep. of Germany

[73] Assignee: Deutsche Aerospace AG - Ottobrunn, Fed. Rep. of Germany

[21] Appl. No.: 18,796

[22] Filed: Feb. 16, 1993

[30] Foreign Application Priority Data

Mar. 19, 1992 [DE] Fed. Rep. of Germany ....... 4208845

[51] Int. Cl.⁵ .............................................. B62D 25/00
[52] U.S. Cl. .......................................... 296/1.1; 296/70
[58] Field of Search ............................ 296/1.1, 70, 97.7

[56] References Cited

U.S. PATENT DOCUMENTS

| | | | |
|---|---|---|---|
| 4,560,245 | 12/1985 | Sarver | 296/97.8 |
| 4,790,591 | 12/1988 | Miller | 296/97.7 |

FOREIGN PATENT DOCUMENTS 3643690  6/1991  Fed. Rep. of Germany .

*Primary Examiner*—Robert R. Song
*Attorney, Agent, or Firm*—Evenson, McKeown, Edwards & Lenahan

[57] ABSTRACT

An arrangement for controlling solar heating of passenger cars comprises a covering material which is glued onto parts which are subjected directly to the radiation of the sun in the vehicle interior, and a switching device. The covering layer is composed of a foil with a controllable capacity to transmit light, a reflecting layer and a carrier material. When the engine is switched off during parking, the foil will transmit light, whereby the incident light is reflected on the reflecting layer. In the driving operation of the passenger car, the foil will be dull, impervious to light and absorbs the incident light.

6 Claims, 2 Drawing Sheets

AIR-CONDITIONING ARRANGEMENT FOR PARKED PASSENGER CARS

BACKGROUND AND SUMMARY OF THE INVENTION

This invention relates to an arrangement for controlling solar heating of the interior of parked passenger cars by means of a foil layer with a controllable light transmission capacity.

A foil with a controllable light transmission capacity of this generic type is known from the German Patent Document DE 36 43 690 C2, in which use of such foil is suggested on vehicle windows and windows of buildings, for components for the purpose of passive solar energy utilization, and as display or picture elements or for optical glass.

The air-conditioning of parked passengers cars is a problem which so far has not been solved satisfactorily. Interior heating caused by incident rays of the sun can result in temperatures of +60° C. and more in a parked vehicle, so that the comfort and well being of the passengers is impaired considerably after they have entered the vehicle. Since not only the air but also the interior fittings, particularly the dashboard and the rear window shelf, are heated, the interior of the vehicle cools down only slowly even with cross-ventilation. Moreover, because of the high energy requirement, air-conditioning systems cannot be used in parked cars, and heat absorbing window glass does not satisfactorily prevent the heating of the vehicle interior.

It is an object of the present invention to provide a solar heating control arrangement of the initially mentioned type, by means of which heating of the vehicle due to solar radiation is reduced effectively during parking.

According to the invention, this object is achieved by a covering, consisting of a foil layer with a controllable light transmission capacity, a reflecting layer and a carrier material, which is applied to the parts in the vehicle interior that are particularly exposed to the radiation of the sun. Switching of the foil layer between light transmitting and light absorbing states is accomplished in a simple manner as a function of the position of the ignition lock by means of a relay, with the foil being transparent when the relay is not energized, so that radiant energy is reflected by the reflecting layer. The control of the foil is virtually without losses and thus stresses the vehicle battery only insignificantly.

The principal advantage of the invention is that the interior trim parts of the vehicle which are directly exposed to the radiation of the sun, such as the dashboard, the consoles and the rear window shelf, reflect the sunlight when the vehicle is parked in order to prevent the heating of the vehicle interior, and have a dull and dark color during the driving operation in order to avoid reflections on the windows.

Other objects, advantages and novel features of the present invention will become apparent from the following detailed description of the invention when considered in conjunction with the accompanying drawings.

DETAILED DESCRIPTION OF THE DRAWING

Figure 1:
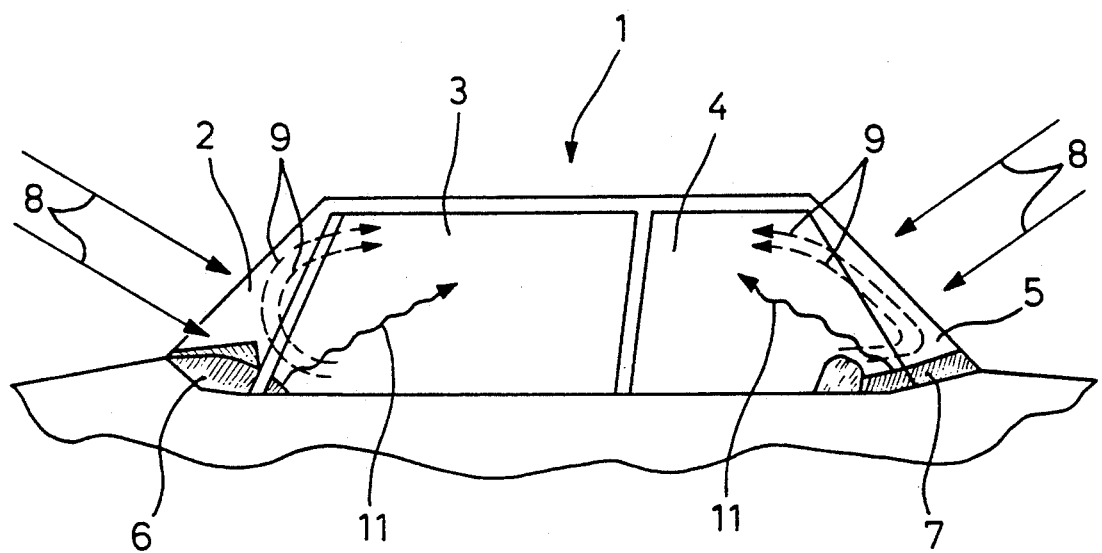
FIG. 1 is a view of the upper part of a passenger car, showing the parts which are essentially exposed to the radiation of the sun.

FIG. 1 shows an upper part of a passenger car 1 comprising a windshield 2, two side windows 3 and 4 and a rear window 5. In the interior of the car, a dashboard 6 and a rear window shelf 7 are visible. As a result of solar radiation indicated by the arrows 8, the dashboard 6 which has a dark color and the rear window shelf 7 will heat up, thus generating convection currents, indicated by arrows 9, and radiant heat indicated by arrows 11. The heat generated in this manner when the passenger car is parked may amount to 60° C. or more. No such overheating can develop during driving operation, however, due to ventilation through the opened windows 3 and 4.

Figure 2:
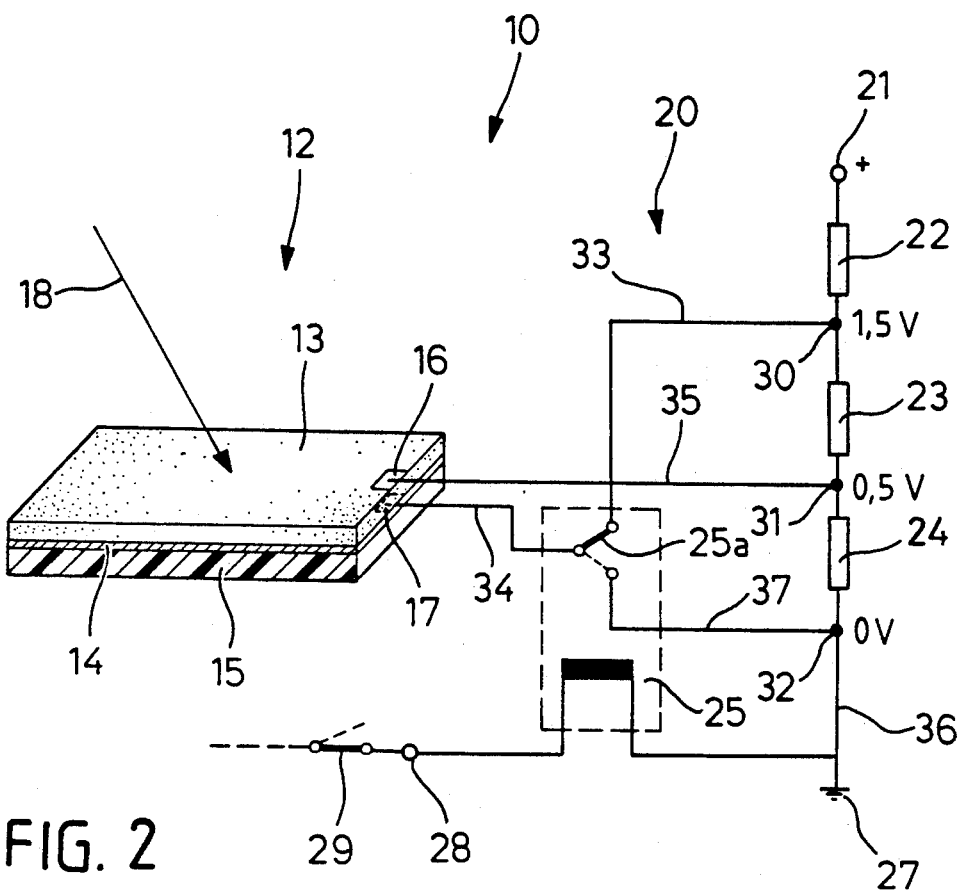
FIG. 2 is a view of the construction of the solar heating control arrangement for a passenger car according to the invention.

By means of the solar heating control arrangement 10 corresponding to FIG. 2, it is possible to reduce substantially the solar heating which occurs in the passenger car 1 during parking. The arrangement 10 comprises a covering 12 and a switching device 20. The covering is constructed of an upper foil layer with a controllable light transmission capacity 13; a reflecting layer 14 made, for example, of aluminum; and a carrier material 15 made, for example, of plastic. The foil 13 has two electrodes 16 and 17 for the application of an electric potential which serves to switch the foil between its light absorbing and light transmitting modes, in a known manner as described herein. By means of an arrow 18, it is indicated that incident light is absorbed on the dull foil.

The switching device 20 comprises a connection point 21 to a battery which is not shown; three resistors 22, 23 and 24; a relay 25; a ground connection 27; and a connection point 28 for the ignition lock which is indicated by a switch 29. A switch 25a is disposed in the relay 25. The resistors 22, 23 and 24 are dimensioned such that a voltage of approximately 1.5V is fed at point 30; a voltage of approximately 0.5V is fed at point 31; and zero voltage is fed at point 32. As shown in FIG. 2, the relay 25 is actuated such that the switch 25a connects electrode 17 to point 30 when the ignition lock 29 is actuated. When the ignition lock is open, as shown by the broken line, switch 25a connects the electrode 17 with ground, via point 32.

Figure 3:
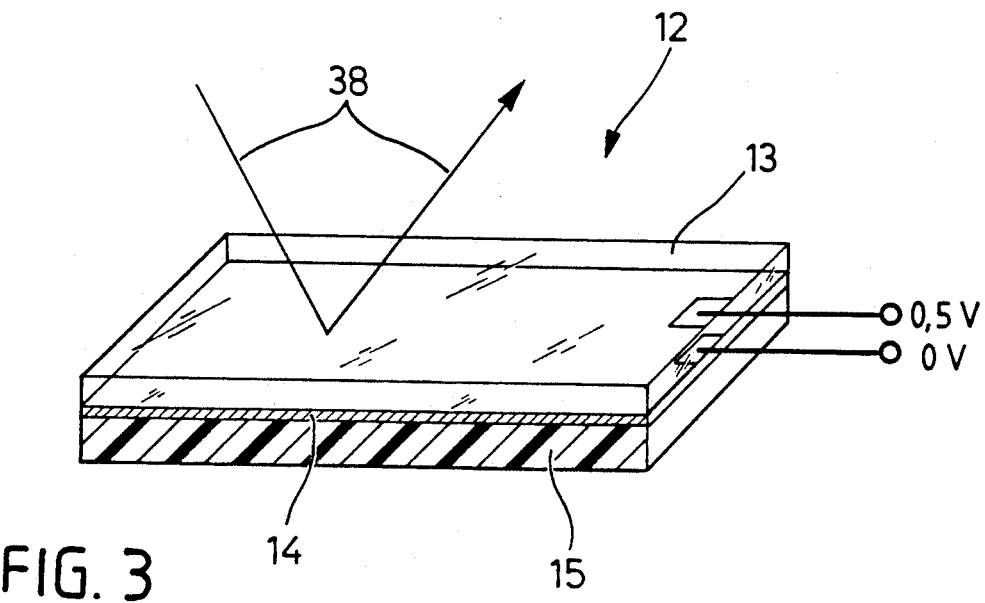
FIG. 3 is a view of a covering for the arrangement according to FIG. 2 when the engine is turned off.

Method of operation: In the representation of FIG. 2, a current flows from the connection point 21 of the battery by way of the resistor 22, the point 30, the line 33, the switch 25a, the line 34, through the foil 13, the line 35, the point 31, the resistor 24, the line 36, to ground 27. A voltage of +1.0V is therefore fed to the foil 13 when the ignition lock 29 is switched on and the relay 25 is actuated, which corresponds to the driving mode of the passenger car 1. The foil 13 is therefore dark and absorbs the incident light 18. When the ignition lock 29 is switched off, as shown by means of a broken line, the relay 25 becomes currentless and its switch 25a is in the position also shown by a broken line. Current flows from point 21, by way of the resistor 22, the resistor 23, the point 31, the line 35, the foil 13, the line 34, the released switch 25a, the line 37, the point 32 and the line 36, to the ground 27. Thus, when the passenger car 1 is parked, and the ignition lock 29 is switched off, a voltage of −0.5V is applied to the foil 13. As shown in FIG. 3, this condition of the foil 13 is light-transmitting so that incident light 38 is reflected on the shiny metal foil 14. Therefore, the covering 12 on the part, such as the dashboard 6 or the rear window shelf 7, to which it is glued, will not heat up.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An arrangement for controlling radiant heating of interior vehicle parts exposed to solar radiation comprising:
   a carrier material;
   a reflecting layer disposed on said carrier material; and
   a foil layer having a controllable light transmitting capacity, which foil layer is disposed on said reflecting layer; and
   a control unit which controls said foil layer to be in a light transmitting state when an engine of said vehicle is switched off, whereby incident light is transmitted to and reflected by said reflecting layer, and to be in a light absorbing state when said engine is switched on.

2. An arrangement according to claim 1 wherein the reflecting layer comprises a metal foil.

3. Arrangement according to claim 2 wherein said metal foil is aluminum.

4. An arrangement according to claim 1 wherein said control unit controls switching of the state of the foil layer in response to a position of an ignition lock, by means of a relay.

5. An arrangement according to claim 4 wherein, when the ignition lock is switched off, the relay is released, and a voltage is fed to the foil which causes the foil to transmit light.

6. An arrangement according to claim 4 wherein the ignition lock 29 is switched on, the relay is energized, and a voltage is fed to the foil which makes the foil impervious to light.

* * * * *